US007806343B2

(12) United States Patent
Wah Lo

(10) Patent No.: US 7,806,343 B2
(45) Date of Patent: Oct. 5, 2010

(54) COUNTERFEIT PROOF LABEL HAVING OPTICALLY CONCEALED SECURITY SAFETY FEATURES AND CLUES FOR CONSUMER'S SELF IDENTIFICATION

(76) Inventor: Allen Kwok Wah Lo, 15A, 54 Hing Fat Street, Hong Kong (HK)

( * ) Notice: Subject to any disclaimer, the term of this patent is extended or adjusted under 35 U.S.C. 154(b) by 1008 days.

(21) Appl. No.: 11/591,051

(22) Filed: Nov. 1, 2006

(65) Prior Publication Data

US 2008/0123991 A1 May 29, 2008

(51) Int. Cl.
*G06K 19/06* (2006.01)

(52) U.S. Cl. .................. 235/494; 235/462.01; 235/488; 235/462.04

(58) Field of Classification Search ................. 235/494, 235/462.01, 488, 462.04
See application file for complete search history.

(56) References Cited

U.S. PATENT DOCUMENTS 4,765,656 A 8/1988 Becker
2005/0039357 A1 2/2005 Geary
2005/0150964 A1* 7/2005 Lo ............................ 235/494
2005/0258637 A1 11/2005 Bi et al.
2007/0267500 A1* 11/2007 Juds ...................... 235/462.32

OTHER PUBLICATIONS

International Search Report, date Sep. 22, 2008.

* cited by examiner

*Primary Examiner*—Allyson N Trail
(74) *Attorney, Agent, or Firm*—Thomas, Kayden, Horstemeyer & Risley, LLP

(57) ABSTRACT

The prevention of counterfeiting labels for various products is addressed by introducing counterfeit proof labels having optically concealed security safety features and clues for consumer's self identification and verification. The images of groups of questions and answers are printed in a precise serial formation, parallel to the optical center of the micro lenticule at the focal plane of a high resolution micro optic array of the label at the location in relation to the optical centers of the micro lenticule and viewing angle, so that each of the questions and answers can be read at a specific viewing angle. For identification, gently tilling the label back and forth, at different angles, each group of the question and answers will be displayed on the label. If the answers correctly match with the questions, the label is proved to be authentic; if one or more of the answers is wrong or not clear the label is a counterfeit. The label can be read under visible light source without any viewing aid.

11 Claims, 4 Drawing Sheets

COUNTERFEIT PROOF LABEL HAVING OPTICALLY CONCEALED SECURITY SAFETY FEATURES AND CLUES FOR CONSUMER'S SELF IDENTIFICATION

TECHNICAL FIELD

The present invention relates to counterfeit-proof label having an optically concealed set of logical symbols of mathematical questions and answers printed on a plurality views of the label as clues for verification. Specifically, the invention is based on the use of high resolution micro optic photo chromogenic material having large optical storage capacity for storing and displaying multiple views of multiple sets of mathematical questions and answers that are readable under visible light source and normal human eyes.

BACKGROUND OF THE INVENTION

Counterfeiting is an old problem despite the advancement of technology. There is still no practical solution to prevent counterfeiting effectively for the reason that all the labels used on products today cannot be identified by the general consumers.

It is therefore the objective of this invention to provide a counterfeit-proof label that can be easily and positively identified by the general consumers. Another objective of the invention is to provide a counterfeit-proof label that includes security safety features and clues for self-identification by the general consumers. Another objective of the invention is to provide a counterfeit-proof label that can be read under a visible light source by normal human eyes so that identification is possible without using any chemical activator, special light source or electronic device.

SUMMARY OF THE INVENTION

Applicant has invented a counterfeit-proof label. It is printed on a high-resolution micro optic photo chromogenic layer of material by a high precision optical imaging process. Multiple views of the label contain multiple sets of mathematical questions and answers. Each set of the questions and answers are printed in multi-color in a precise serial format that perfectly aligns with the linear optical center of the micro optic array of the label. Any off alignments of the printed image element will disarrange the questions and answers on the label and the wrong answers will be seen.

One of the big advantages of the invention is its easy identification and simplicity. A set of simple mathematical questions and answers or logical symbols are printed on different views of the label. When identifying, gently tilt the label back and forth, at different angle, each group of question and answer will be displayed on the label. If the answers match with the questions correctly, the label is authentic; if one or more of the answers are wrong or not clear, then the label is counterfeit.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Exemplary embodiment of the invention will be described in conjunction with the drawings in which.

DETAILED DESCRIPTION OF THE INVENTION

According to the present invention, a micro optic counterfeit-proof label having clues for consumer's self-verification is provided. The label has multiple groups of simple mathematical questions and answers or logical symbols printed on different views of the label. The color image elements of each of the questions and answers are printed in an absolute precise serial formation that perfectly aligns with the linear optical center of the micro lenticule.

The clue for the consumer to verify the authenticity of the label is to match the answers to the questions on each view. When the image elements of any of the questions and answers are not printed in a precise serial formation or not perfectly aligned with the linear optical center of the micro lenticule on certain views of the label a wrong answer will be displayed.

The numbers that make up the questions and answers will be printed in different colors to increase the level of security thus increasing the difficulty in counterfeiting.

The micro optic photo chromogenic material is made of high optical grade copolymer. The preferred thickness is between 0.1 mm-1.5 mm with a frequency of between 2 to 50 lenticule per mm. The photo chromogenic layers are coated or attached to the focal plane of the micro lenticule with or without a permeable reflective layer. Preferably the lenticules have a refractive index between 1.4 and 1.65. The mathematical questions printed on the label can be any equation. Questions and answers of other subjects can also be used in a combination in place of the mathematical questions and answers, including sequentially displaying a set of numbers or letters in a designed order, a company name or a serial of credit card numbers, or of multiplication table, etc. The questions and answers can on any subject including a quiz or mathematical question and answer, a multiplication table, a design of interactive nature or a sequential display of symbols, such as numbers or letters, in a logical order, or a phrase from a poem or book or bible. It could be a birthday or anniversary with the month, day and year in sequence.

Figure 1:
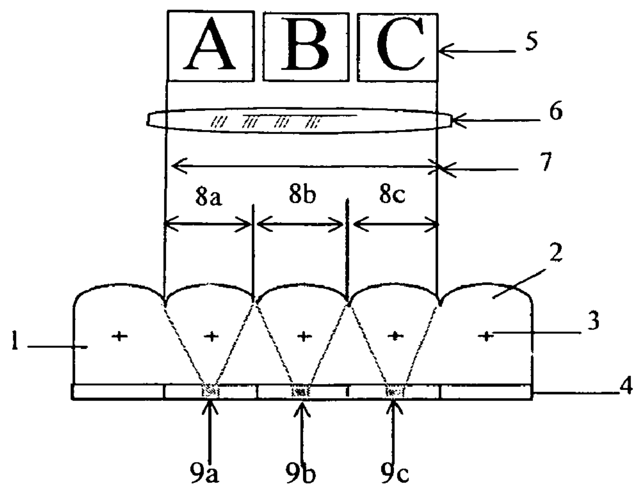
FIG. 1 is an enlarged cross-section of a small portion of a micro optic photo chromogenic material.

FIG. 1 is an enlarged cross-section of a small portion of a micro optic photo chromogenic material for making of the counterfeit-proof label. The numeral 1 is the cross-section of the material having micro lenticule 2, with the optical center 3, photo chromogenic layer 4. During printing the original image 5 is projected through optical assembly 6, projecting light rays 7 onto the surface of the material and split into sub projecting rays 8*a*, 8*b*, 8*c* and forming split and compressed images 9*a*, 9*b* and 9*c* from original image 5.

Figure 2:
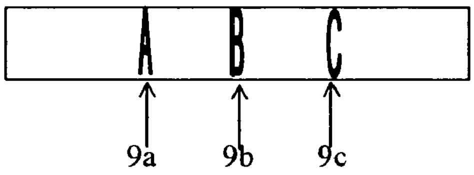
FIG. 2 is the top view of a small portion of the label with the micro optic layer omitted.

FIG. 2 is the top view of compressed images 9*a*, 9*b* and 9C with the micro optic layer omitted.

Figure 3:
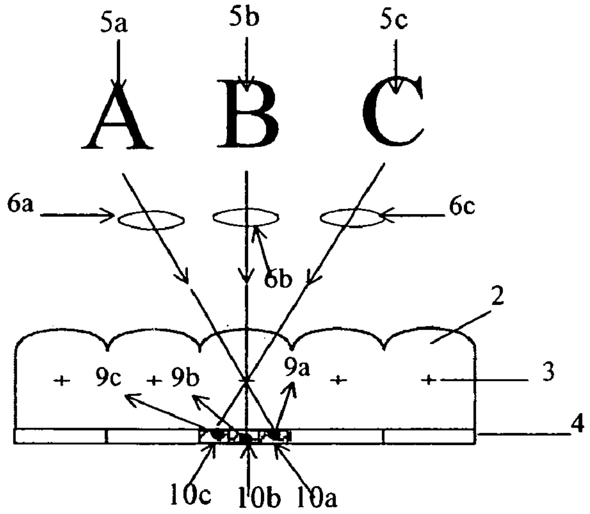
FIG. 3 is an enlarged cross-section of a small portion of the label.

FIG. 3 is an enlarged cross-section of a small portion of the label showing the projection angle and locations of the image elements of the different views of original images 5*a*, 5*b*, 5*c* projecting through optical assembly 6*a*, 6*b* and 6*c* forming image elements 9*a*, 9*b*, 9*c* on locations 10*a*, 10*b* and 10*c* of photo chromogenic layer 4.

Figure 4:
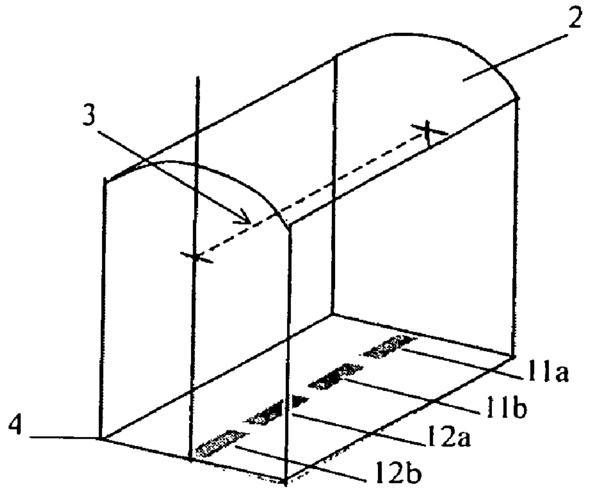
FIG. 4 is a perspective view showing color image elements of the mathematical questions and answers, precisely printed in a serial formation and perfectly aligned with the linear optical center of a micro lenticule.

FIG. 4 is a perspective view illustrating the color image elements of a group of questions and answers precisely arranged in a serial formation and perfectly aligned with the linear optical center of the lenticule. The numeral 2 is an individual lenticule of the material, 3 is the linear optical center of the lenticule, 4 is the photo chromogenic layer, 11*a*, 11*b* are the image elements of the question, and 12*a*, 12*b* are the image elements of the answers all precisely printed in a serial formation that perfectly aligns with the linear optical center 3 of the lenticule.

Figure 5:
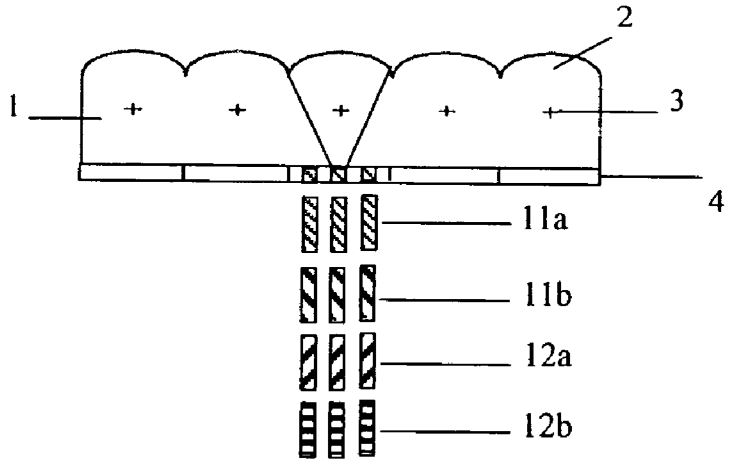
FIG. 5 is a cross-section of a small portion of the label showing the image elements of multiple group of questions and answers arranged in serial format under a micro lenticule.

FIG. 5 illustrates the image elements of a multiple group of questions and answers arranged in precise serial formation under a lenticule. Image elements of the questions 11*a* and 11*b* are precisely aligned with image elements of the answers 12*a* and 12*b*.

Figure 6:
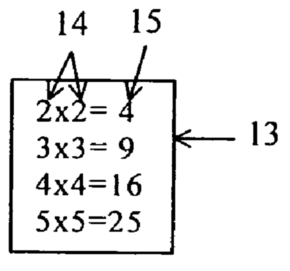
FIG. 6 is a top view of the label having many sets of mathematical questions and answers.

FIG. 6 illustrates a view of the label with a multiple group of questions and answers. View 13 shows mathematical questions 14 and answers 15.

Figure 7:
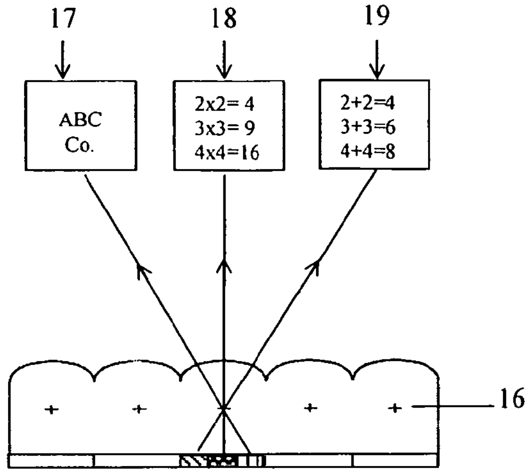
FIG. 7 is a cross-section of a small portion of a label showing the label displaying different views of mathematical questions and answers and the view of information of the product at different viewing angles.

FIG. 7 illustrates a label having different views of mathematical questions and answers and comprising the numeral 16 is the cross section of the label, 17 is the view having the name of the company, and 18 and 19 are views with mathematical questions and answers.

Figure 8:
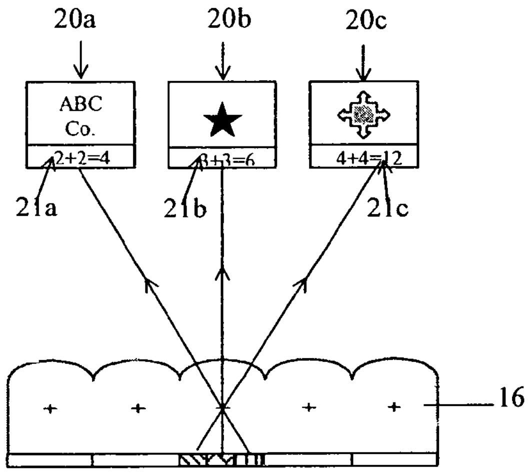
FIG. 8 is a cross-section of a small section of a label showing another design format of the label having mathematical questions and answers and product information on the same view.

FIG. 8 illustrates another design formation of the label having both product information 20*a*, 20*b*, 20*c* and mathematical questions and answers 21*a*, 21 *b* and 21*c*.

Figure 9:
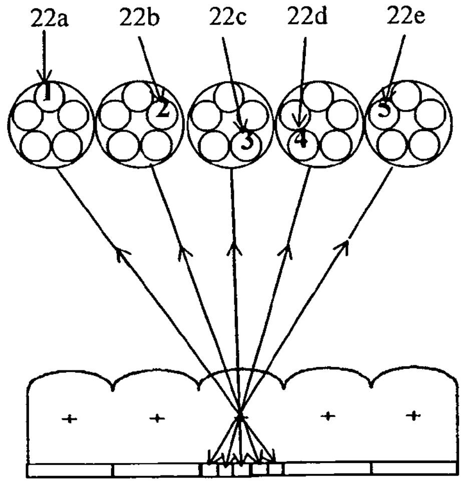
FIG. 9 is a cross-section of a small section of a label showing the label sequentially displaying in I.D. number at different viewing angles.

FIG. 9 illustrates views of label having a sequence of an I.D. numbers 22*a* to 22*e* at different viewing angles.

Figure 10:
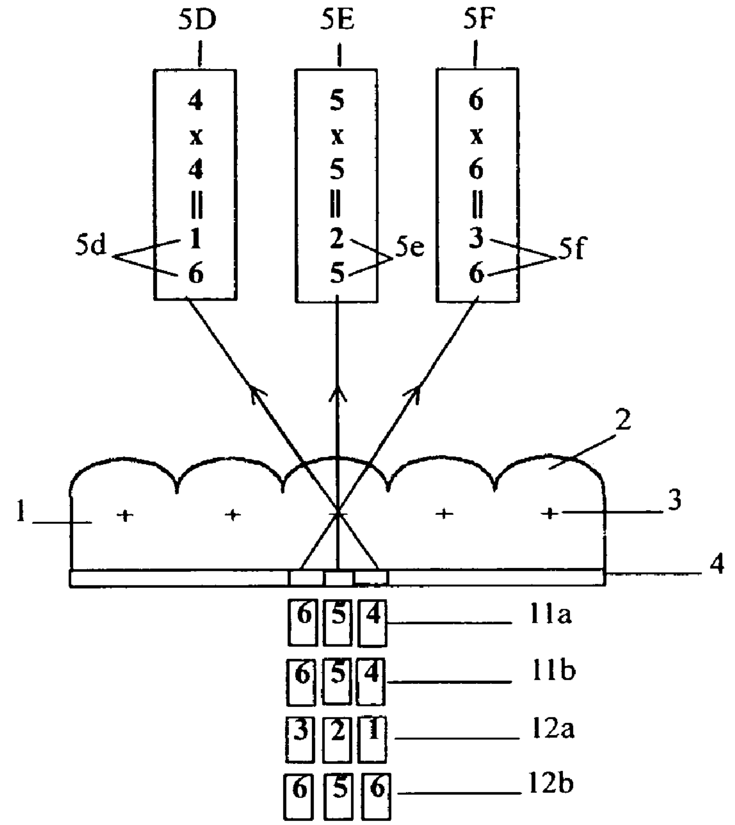
FIG. 10 is a cross-section of a small portion of a label showing the images elements of multiple group of questions and answers correctly printed in a serial format.

FIG. 10 illustrates image elements 11*a*, 11*b*, 12*a*, 12*b* of a multiple group of questions and answers printed in precisely serial formation and views 5D, 5E and 5F displaying correct answers 5*d*, 5*e* and 5*f*. Image elements 11*a*, 11*b*, 12*a*, 12*b* are precisely aligned.

Figure 11:
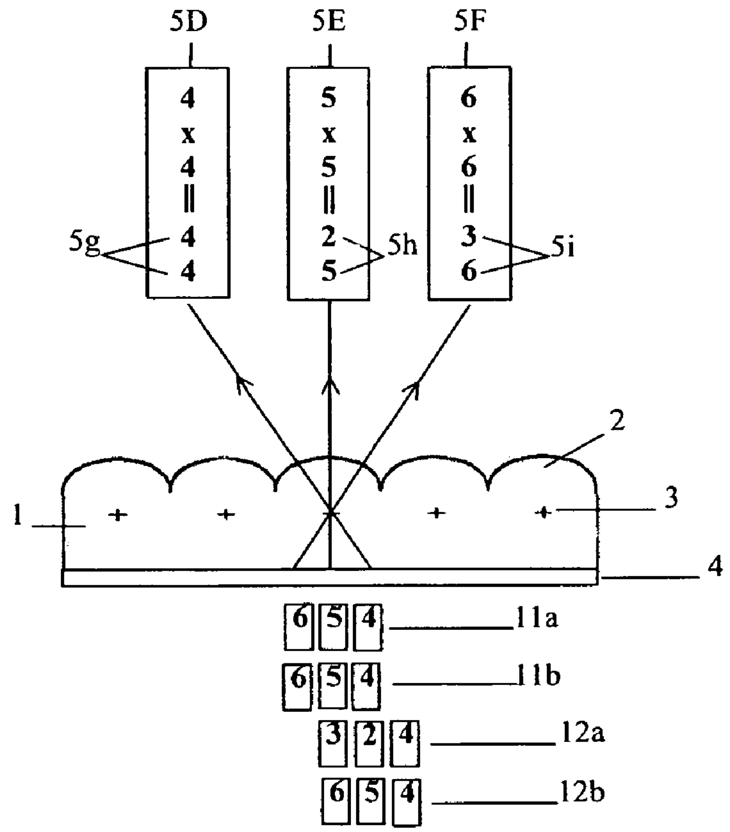
FIG. 11 is a cross-section of a small portion of a label showing the image elements of multiple groups of questions and answer not in a serial format.

FIG. 11 illustrates image elements of the answers 12*a* and 12*e* that are not aligned with image elements of the questions 11*a* and 11*b* so the wrong answer or no answer is displayed.

Therefore, having thus described the invention, at least the following is claimed:

1. A micro optic counterfeit-proof label having clues for a consumer's self verification, the label comprising a plurality of lenticules, each with a precise linear optical center with a plurality of viewing angles through the center, each lenticule having a photo chromogenic layer, with a plurality of coupled indicia, in which at least one of the coupled indicia are mathematical questions and answers, printed in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

2. The micro optic counterfeit proof label of claim 1, in which at least one of the views has a single or multiple group of mathematical questions and answers.

3. The micro optic counterfeit-proof label of claim 1, in which all of the coupled indicia are mathematical questions and answers.

4. The micro optic counterfeit-proof label of claim 1, in which one indicia of a couple is printed at one viewing angle and the other indicia of a couple is printed at another viewing angle.

5. The micro optic counterfeit-proof label of claim 1, in which the label has a frequency of from 2 to 50 lenticules per mm.

6. A micro optic counterfeit-proof label having clues for a consumer's self verification, the label comprising a plurality of lenticules, each with a precise linear optical center with a plurality of viewing angles through the center, each lenticule having a photo chromogenic layer, with a plurality of coupled indicia, in which the coupled indicia are questions and answers, printed in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

7. A micro optic counterfeit-proof label having clues for a consumer's self verification, the label comprising a plurality of lenticules, each with a precise linear optical center with a plurality of viewing angles through the center, each lenticule having a photo chromogenic layer, with a plurality of coupled indicia, in which at least one of the coupled indicia are is a logical sequence of symbols, printed in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

8. A micro optic counterfeit-proof label having clues for a consumer's self verification, the label comprising a plurality of lenticules, each with a precise linear optical center with a plurality of viewing angles through the center, each lenticule having a photo chromogenic layer, with a plurality of coupled indicia, in which at least one of the coupled indicia is a phrase from a literary work, printed in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

9. A micro optic counterfeit-proof label having clues for a consumer's self verification, the label comprising a plurality of lenticules, each with a precise linear optical center with a plurality of viewing angles through the center, each lenticule having a photo chromogenic layer, with a plurality of coupled indicia, in which at least one of the coupled indicia is a date that would be known to the person verifying the genuiness of the label, printed in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

10. A method of printing a counterfeit-proof label having clues for a consumer's self verification, the label consisting of a lenticular screen with a plurality of lenticules, each with a precise linear optical center with a plurality of viewing angles through the center, each lenticule having a photo chromogenic layer, said process comprising precisely printing a plurality of coupled indicia in which at least one of the coupled indicia is a logical sequence of symbols in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

11. A method of printing a counterfeit-proof label having clues for a consumer's self verification, the label consisting of a lenticular screen with a plurality of lenticules, each with a precise linear optical center with a plurality of viewing angles through the center, each lenticule having a photo chromogenic layer, said process comprising precisely printing a plurality of coupled indicia in which at least one of the coupled indicia is a phrase from a literary work, in precise alignment of each couple in relation to the linear optical center of each lenticule when viewed from a particular viewing angle, so that a genuine label can be easily identified when viewed by a person from a particular viewing angle as the indicia of each couple will be perfectly aligned, while the lack of perfect alignment of the indicia in each couple will indicate that the label is a counterfeit label.

* * * * *